(12) United States Patent
Fare'

(10) Patent No.: US 12,054,865 B2
(45) Date of Patent: Aug. 6, 2024

(54) APPARATUS AND PROCESS FOR PRODUCING A NONWOVEN FABRIC

(71) Applicant: FARE' S.P.A. a Socio Unico, Fagnano Olona (IT)

(72) Inventor: Rosaldo Fare', Fagnano Olona (IT)

(73) Assignee: FARE' S.P.A. a Socio Unico, Fagnano Olona (IT)

(*) Notice: Subject to any disclaimer, the term of this patent is extended or adjusted under 35 U.S.C. 154(b) by 0 days.

(21) Appl. No.: 18/101,738

(22) Filed: Jan. 26, 2023

(65) Prior Publication Data

US 2023/0257921 A1 Aug. 17, 2023

(30) Foreign Application Priority Data

Jan. 28, 2022 (IT) .................. 102022000001475

(51) Int. Cl.
*D01D 5/088* (2006.01)
*B01D 46/00* (2022.01)
(Continued)

(52) U.S. Cl.
CPC ........... *D04H 3/16* (2013.01); *B01D 46/0047* (2013.01); *B01D 46/2407* (2013.01); *B01D 46/2411* (2013.01); *D01D 4/02* (2013.01); *D01D 10/02* (2013.01); *B01D 2273/30* (2013.01); *B29C 2791/006* (2013.01)

(58) Field of Classification Search
CPC ............ B01D 46/0047; B01D 46/2407; B01D 46/2411; B01D 2273/30; B29C 2791/006; D01D 4/02; D01D 5/08; D01D 5/088; D01D 5/092; D01D 5/098; D04H 3/03

USPC .... 264/101, 102, 103, 210.4, 210.5, 211.14; 425/66, 72.2, 464; 55/467
See application file for complete search history.

(56) References Cited

U.S. PATENT DOCUMENTS 3,489,832 A 1/1970 Bruton et al.
3,632,719 A 1/1972 Tetsuo
(Continued)

FOREIGN PATENT DOCUMENTS

| EP | 2099959 A2 | 9/2009 | |
|---|---|---|---|
| GB | 2135629 A * | 9/1984 | ............ D01D 5/092 |
| WO | WO-8903903 A1 * | 5/1989 | ............ D01D 5/092 |

OTHER PUBLICATIONS

European search report issued by the EPO on Jun. 21, 2023 for corresponding EP application No. 23153444.7.
(Continued)

*Primary Examiner* — Leo B Tentoni

(57) ABSTRACT

Apparatus (1) for producing nonwoven fabrics, comprising: a spinneret (2) comprising an extrusion surface (2a) having at least one first group (4) of extrusion holes (3) and a second group (5) of extrusion holes (4); cooling elements (15, 15'); suction elements (7, 8, 9, 10, 11, 12, 13, 14); drawing elements to draw said filaments (100); wherein said suction elements (7, 8, 9, 10, 11, 12, 13, 14) comprise a plurality of first suction channels (7) forming corresponding openings (7a) on said extrusion surface (2a), which are arranged between the first group (4) and the second group (5) of extrusion holes (3), said first channels (7) being fluidically connected to a first chamber (8) made in said spinneret (2), the suction elements (7, 8, 9, 10, 11, 12, 13, 14) comprising one or more second suction channels (9) configured to suction gas from said first chamber (8).

17 Claims, 3 Drawing Sheets

(51) Int. Cl.
  *B01D 46/24*   (2006.01)
  *D01D 4/02*   (2006.01)
  *D01D 5/092*  (2006.01)
  *D01D 5/098*  (2006.01)
  *D01D 10/02*  (2006.01)
  *D04H 3/03*   (2012.01)
  *D04H 3/16*   (2006.01)

(56) References Cited

U.S. PATENT DOCUMENTS

| | | | |
|---|---|---|---|
| 3,737,508 A * | 6/1973 | Weir | ........................ D01D 4/02 |
| | | | 425/72.2 |
| 5,122,321 A | 6/1992 | Chambers | |
| 2003/0178742 A1 | 9/2003 | Geus et al. | |
| 2010/0099321 A1* | 4/2010 | Fare' | ...................... D01D 5/088 |
| | | | 264/103 |

OTHER PUBLICATIONS

Priority Search Report issued on Sep. 14, 2022 by the EPO for IT priority application No. IT202200001475 .

* cited by examiner

APPARATUS AND PROCESS FOR PRODUCING A NONWOVEN FABRIC

This Application claims priority to and the benefit of Italian Patent Application No. 102022000001475, filed on 28 Jan. 2022, the content of which is incorporated herein by reference in its entirety.

The present invention relates to an apparatus and process for producing a nonwoven fabric by extruding filaments; more specifically, the invention relates to a process and device for producing filaments which are extruded from dies and drawn in an air stream (i.e., by aerodynamic means).

A typical apparatus for producing filaments by extrusion comprises a spinneret fed by extruders, a cooling chamber where the filaments undergo a first partial cooling, a drawing unit, and a unit for collecting the obtained filaments, which are usually already in the form of nonwoven fabric.

Of particular importance among the apparatus components is the cooling chamber or unit located immediately downstream of the extrusion die. Air is fed into that chamber to partially cool the filaments extruded by the die, that is to say that the filaments are solidified to such a degree that they can still be drawn to the desired size in the next step of high-speed air exposure.

Apparatuses equipped with cooling means that direct air flows onto the filament bundle are known. In particular, apparatuses for producing a spunbond nonwoven fabric are known in which the cooling region for the filaments exiting the die provides a plurality of chambers, usually two, which are fed with air at different temperatures so that the cooling of the filaments is speeded up and the production speed can be increased.

A problem of the known apparatuses is that, as filaments are extruded, oligomers and possibly also monomers are produced at the output region of the die, as well as high-temperature degradation products, which not only are potentially harmful to operators' health but also have high temperature that hinders the filament cooling action. An additional problem of the oligomers/monomers generated at the die outlet is that they are deposited on the filaments and are also dragged into the drawing channel where they deposit on the walls thereof.

Apparatuses with suction devices to remove oligomer and monomer fumes laterally to the filament bundles have been proposed. However, this solution is not enough to solve the problems discussed above. In fact, in known devices, the filaments produced in the outermost region of the filament bundle (near the cooling air inlet) turn out to be better cooled than those placed further inward and are less likely to be contaminated by oligomers of the thermoplastic material. In other words, the characteristics of the filaments of the same filament bundle are not uniform within the latter; filaments close to the source of cooling air have different mechanical and technical characteristics from those produced in the inner region, e.g. very different yarn count, amorphousness and drawing properties.

A purpose of the present invention is to solve the above-mentioned problems by providing a process and apparatus for producing filaments by extrusion that allow progressive cooling of the filaments to be achieved while operating at high speed and the filament characteristics to be made uniform throughout the filament bundle.

Further purpose of the present invention is to provide a system with effective removal of oligomers and degradation products from the extruded polymer.

These and other objects are achieved by the present invention as discussed in one or more of the appended claims.

Specifically, an aspect of the present invention relates to an apparatus and a related process according to the appended claims.

In more detail, an aspect of the present invention relates to an apparatus for producing a nonwoven fabric, comprising: a spinneret adapted to extrude pluralities of filaments, comprising an extrusion surface provided with at least one first group of extrusion holes and a second group of extrusion holes, wherein the first group is distinct and spaced apart from the second group; cooling elements to cool the filaments, adapted to direct a gas, preferably air, against the filaments; suction elements adapted to remove gas from the space region comprising the filaments exiting the extrusion holes; and drawing elements to draw the filaments. The suction elements comprise a plurality of first suction channels forming corresponding openings on the extrusion surface, the openings being arranged between the first group and the second group of extrusion holes; the first channels are fluidically connected to a first chamber made in the spinneret. The suction elements further comprise one or more second suction channels configured to suction gas from the first chamber.

Advantageously, the second suction channels are arranged along the extent of the first chamber and have a longitudinal axis parallel (or possibly coincident) with the longitudinal axis of the first channels. Preferably the second channels are offset with respect to the first channels, as best illustrated below.

The spinning, or extrusion, holes are preferably arranged in a straight arrangement and are longitudinally aligned with the spinneret; they are separated by a space in a manner known in the art in spunbond systems, such as in WO2008/072278 in the name of the Applicant. By separating the groups of extrusion holes from each other, multiple filament groups can be formed, usually two straight groups separated from each other, which can be more easily cooled than a single group comprising all the filaments, which would have larger dimensions. In fact, in such a case, the cooling air would have to travel a longer path between the filaments, which, being at high temperature, would progressively heat the air, which would be made increasingly ineffective as it travels.

Moreover, the suction arranged between the groups of extrusion holes allows effective removal of oligomers, monomers and similar products, such as for example degradation products (so-called extrusion fumes) at the central region of the extrusion surface.

The first chamber downstream of the first suction channels (considering the flow of gases during the suction thereof under the condition of use of the apparatus) can act as a "buffer", thus making considerably more uniform the gas inlet speed into the first channels. In fact, in case of undesirable variations in suction, for example in the flow rate thereof, the filaments could be diverted within their path, and in particular they could come into contact with each other along their path, before the drawing step. This possibility reduces the quality of the final nonwoven fabric.

The presence of at least one first chamber in the suction circuit contributes to prevent, or at least minimize, this risk. In addition, due to the presence of at least one chamber connecting the suction channels together, the speed of the air being suctioned through the channel openings is essentially uniform along all the openings on the extrusion surface.

The presence of the at least one chamber connecting the channels to each other also results in a surprising increase in the cooling capacity of the innermost filaments and an equally surprising increase in the hourly output, which improvement is quantifiable at about 15%-30% increase (in kg/hour).

According to a possible aspect, the second suction channels are fewer in number than the first suction channels and have larger average section than the first suction channels.

Due to this, the power consumption of the apparatus can be reduced or in any case the number of first channels can be increased, so as to distribute the central suction as much as possible between the groups of extrusion holes. In fact, as known, in order to suction gases from channels, typically through known-in-the-art aspirators, low pressure must be generated.

Arranging a large number of first channels, without the first chamber described above, would mean either providing each channel with a corresponding aspirator, with undeniable high power consumption, or merging one or more of the first channels together; in the second case, the pressure drops would be very high, thereby only partially solving the problem of power consumption, thus limiting the maximum number of first channels.

On the contrary, the present solution allows a large number of first channels to be arranged, even having small dimensions (and thus high pressure drops). In fact, the path of the first channels is not particularly long inside the spinneret, as they flow into the first chamber. Gases can be taken therefrom through the second suction channels, which are of appropriate number and size to ensure effective gas removal with reduced pressure drops and, therefore, reduced power consumption.

According to a possible aspect, at least part of the second suction channels have offset axis from the first suction channels.

This allows for better distribution of the gases suctioned by the first channels within the first chamber.

According to a further aspect, the apparatus can comprise a second chamber made in the spinneret, so that the second suction channels are configured to take gas from the first chamber and deliver it to the second chamber. The suction elements comprise one or more third suction channels configured to take gas from the second chamber towards a fluidic outlet from the spinneret.

Preferably, the third suction channels are fewer in number than the second suction channels, they typically consist of a single third suction channel and they have larger average section than the second suction channels.

The presence of a second "buffer" enables further stabilization of the gas suction flow.

Additionally, the presence of an even smaller number of third channels, possibly a single third channel, makes the connection of the aspirators to the apparatus easier.

According to a possible aspect, the suction elements comprise suction ports arranged, in use, below the extrusion surface of the spinneret, laterally to the groups of extrusion holes.

This allows more effective suction of the oligomers formed by the filament extrusion process.

According to a possible aspect, the cooling elements comprise blowing elements arranged below the extrusion surface of the spinneret, laterally to said groups of extrusion holes, and also below said suction ports, if any. Preferably, the second blowing elements are arranged below the first blowing elements.

According to a possible aspect, in use, the extrusion surface is substantially horizontal and at least one suction channel is substantially vertical.

According to a possible aspect, the spinneret has a substantially parallelepiped shape. According to a possible aspect, at least one suction channel is thermally insulated. In other words, the first suction channels and/or the second suction channels and/or the third suction channels are thermally insulated.

According to a possible aspect, at least one suction channel is equipped with a filtering element for separating air from oligomers. Typically, such an element is arranged on the channels arranged further downstream in the fluidic path of the gases suctioned within the spinneret. These channels are the second channels or the third channels, if any, typically the single third suction channel.

An aspect of the present invention further relates to a process for producing a nonwoven fabric by means of an apparatus according to one or more of the preceding aspects, comprising the steps of: i. Extruding a plurality of filaments from said groups of extrusion holes; ii. Cooling the filaments; iii. Drawing the filaments; iv. Depositing the filaments; further comprising a step of suctioning gases between the extruded filaments from the first and second extrusion groups by means of, in series, the first suction channels, the first chamber, the at least one second suction channel, and the second chamber and the at least one third suction channel, if any.

According to a possible aspect, the gas temperature in the first suction channels is between 100° C. and 250° C., preferably between 120° C. and 200° C.

According to a possible aspect, the gas temperature at the suction ports is between 50° C. and 150° C., preferably between 80° C. and 120° C.

According to a possible aspect, the gas temperature of the gas ejected from the cooling elements is between 10° C. and 60° C. wherein, preferably, the temperature of gas ejected from the first blowing elements is between 14° C. and 45° C., and the temperature of the second blowing elements is between 10° C. and 55° C.

According to a possible aspect, the gas speed in the first suction channels and/or at the suction ports is between 0.4 and 6 m/s.

According to a possible aspect, the gas speed of the gas ejected from cooling elements is between 0.8 and 8 m/s.

According to a possible aspect, the linear density of the filaments extruded by the spinneret is between 1.1 and 6 dtex, for example, between 1.1 and 4.0 dtex.

The invention will now be described in more detail with reference to the drawings included for illustrative and non-limiting purposes, where:

Figure 1:
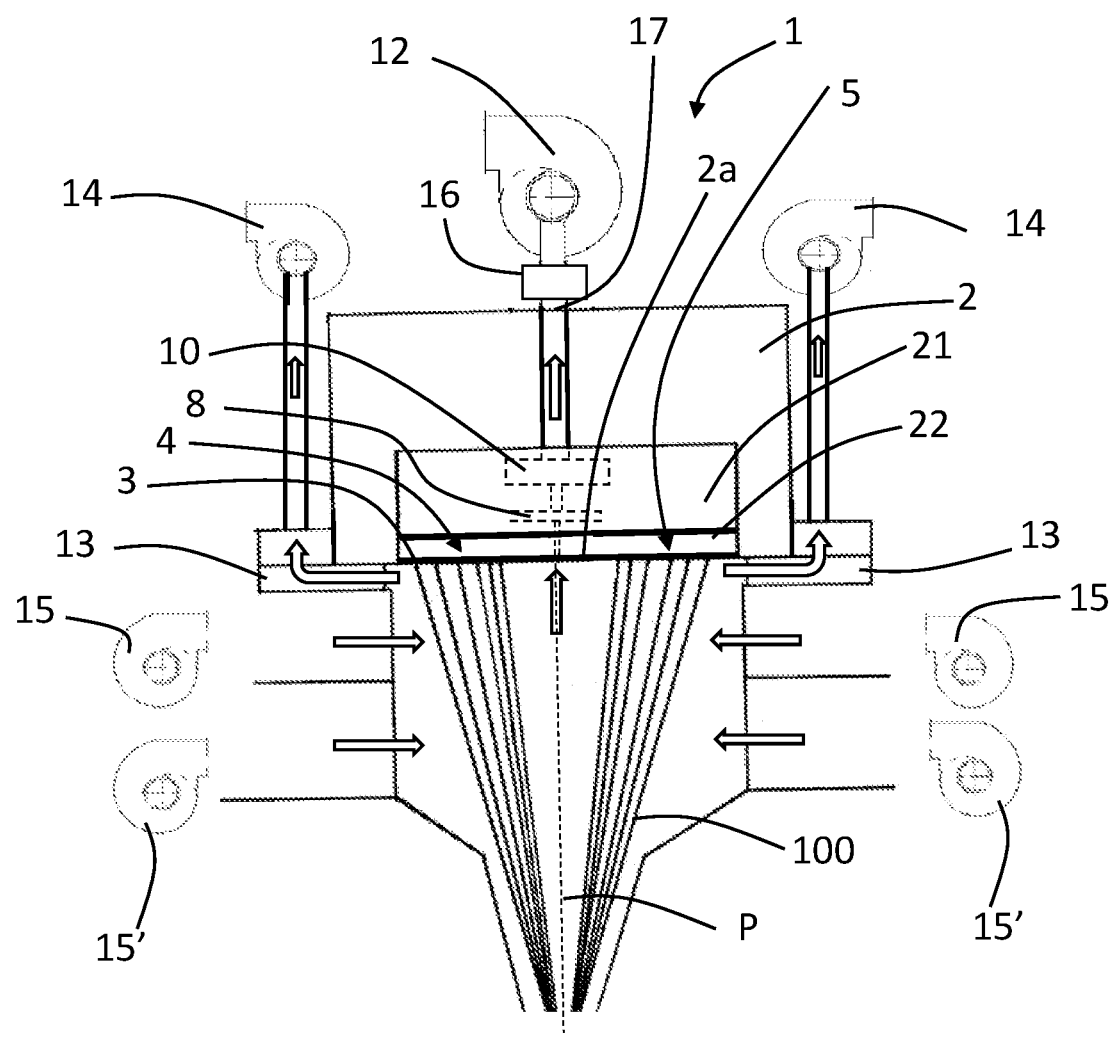
FIG. 1 is a side view of the extrusion assembly of an apparatus according to the invention.
Figure 2:
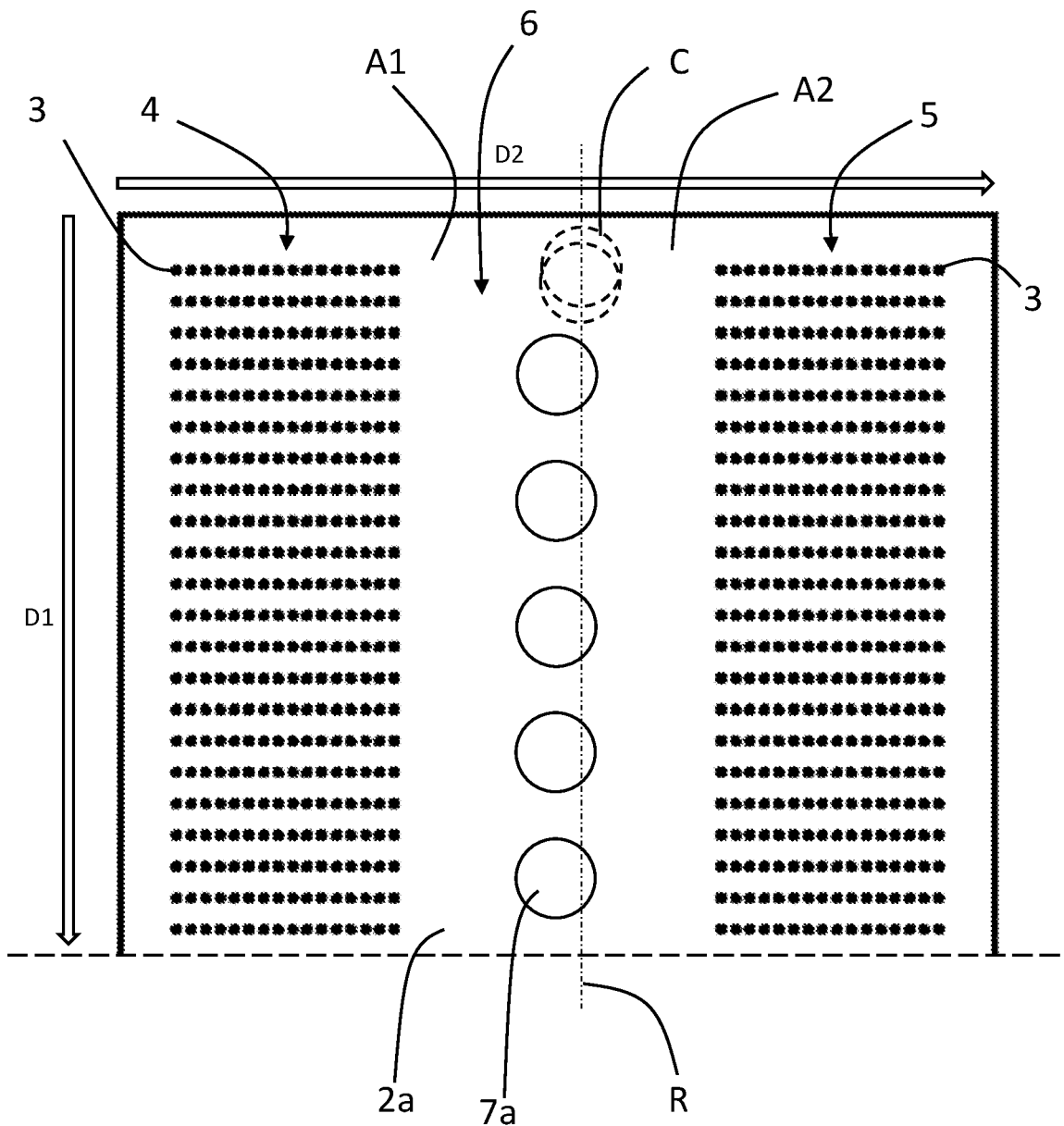
FIG. 2 is an enlarged view of a portion of the central region between the two groups of spinning holes.

The apparatus 1 for producing a nonwoven fabric of filaments 100 according to the present invention comprises a spinneret 2 for extruding a plurality of filaments 100 and having one or more extruders (not shown) connected thereto for extruding or co-extruding single-, two-, or tri-component filaments 100, as known in the art and as for example described and claimed in the patents EP1126055 and EP0786543, both in the name of Fare.

The distribution of the polymer to the holes of the spinneret 2 takes place by known methods, such as by planetary gear pumps. In a known way, in the case of a process involving the use of two different polymers, polymer A and polymer B, such as for the production of coextrudate, two circuits, each typically equipped with a pump or similar element, will be required for each portion of the spinneret in order to feed the two different polymers to the respective extrusion holes. Typically, the distribution channels of the polymer (or polymers) from the pump to the holes of the spinneret 2 are sized (length and cross section) so as to have uniform pressure drops at every holes, in a manner known in the art, such as for example having all the same length and cross section.

The spinneret 2 is provided with an extrusion surface 2a equipped with a plurality of extrusion holes 3, i.e., holes to form the filaments 100, forming at least one first group 4 and one second group 5 of extrusion holes 3.

Usually, the spinneret 2 comprises a die 22, equipped with the aforementioned extrusion holes 3, channels forming these extrusion holes known in the art and not shown in detail. The spinneret 2 may also comprise a die holder 21 arranged in use above the die 22 and comprising inflow channels of the polymers to the die 22. The two elements may be distinct from each other and thus constrained together, or they can be two different regions of the same element.

In general, the spinneret 2 comprises known means adapted to extrude the filaments 100 from the respective extrusion holes 3.

The two groups 4, 5 are separated from each other by a region 6 of the spinneret with no extrusion holes.

The extrusion surface 2a typically has a substantially rectangular shape and in general typically has a larger dimension D1 and a smaller dimension D2.

Considering the smaller dimension D2 of the extrusion surface 2a, the hole-free region 6 is typically interposed between the two groups 4, 5 of extrusion holes.

The apparatus 1 further comprises cooling elements adapted to direct a gas, preferably air, against the filaments 100, and suction elements adapted to remove gas from the region where there are the newly extruded filaments 100.

Specifically, the suction elements comprise a plurality of first suction channels 7 that form corresponding openings 7a on the extrusion surface 2a of the spinneret and that are arranged between the first group 4 and the second group 5 of extrusion holes.

Preferably, a line R parallel to the larger dimension D1 of the extrusion surface 2a can be traced in the plane of the extrusion surface 2a and it passes through at least one opening 7a, such that any circumference C having a center on that line R and having dimensions equal to at least one of the openings 7a contains no extrusion hole. The extrusion surface 2a is divided into two areas A1 and A2 by this line R. The extrusion holes 3 present in the first area A1 can be identified as the first group 4 of extrusion holes 3, whereas the extrusion holes 3 present in the second area A2 can be identified as the second group 5 of extrusion holes 3.

The first channels 7 typically have axes substantially perpendicular to the extrusion surface 2a.

Figure 3:
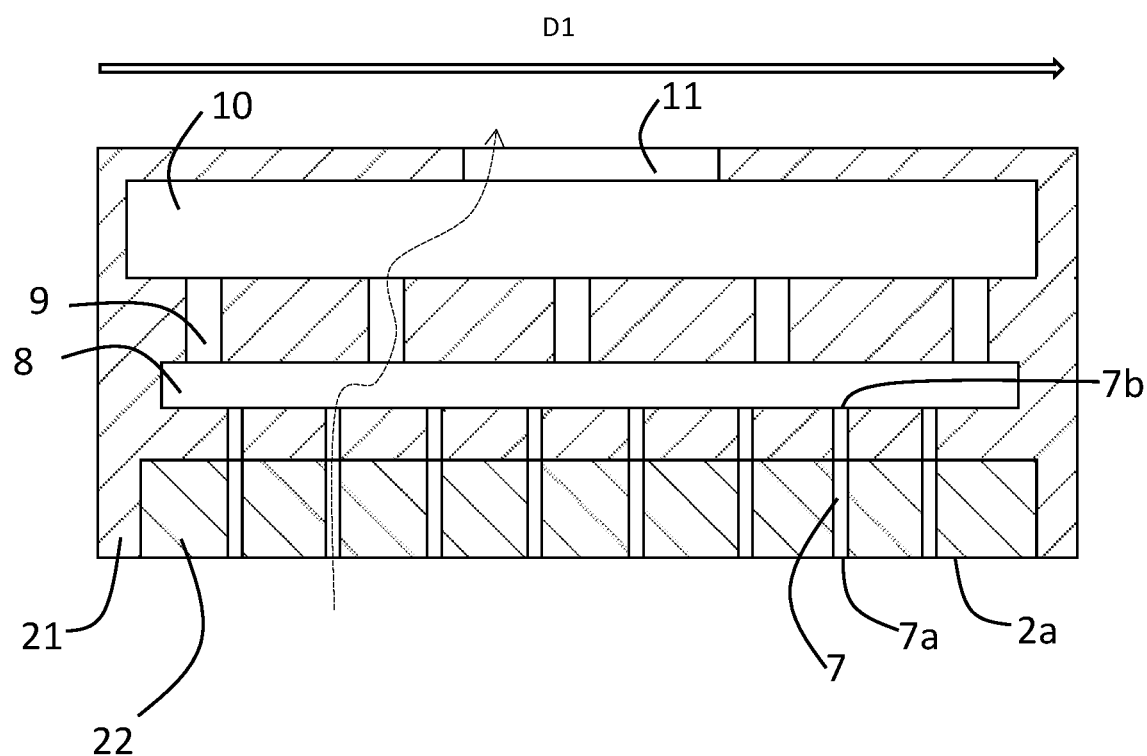
FIG. 3 is a schematic cross sectional view of a part of the spinneret according to the invention.

The first channels 7 are shown in FIG. 3 and are preferably arranged in a straight row to form openings 7a that are essentially circular but can be made in multiple rows, straight or not, parallel or uneven, and can have different cross sections so as to form openings 7a with shapes different from the circular one shown.

The first channels 7 are fluidically connected to a first chamber 8 made in the spinneret 2. Preferably, the first channels have a first end adapted to form the aforementioned openings 7a on the extrusion surface 2a and a second end 7b adapted to form openings in the first chamber 8.

Typically, the largest dimension of the chamber 8 is arranged in the direction of the larger dimension D2 of the extrusion surface 2a so as to provide distributed suction openings side by side with the extrusion holes 3.

The apparatus 1 also comprises second suction channels 9 configured to suction gas from the first chamber 8. The second suction channels 9 are preferably fewer in number than the first channels 7, possibly a single second channel 9 can also be provided, although it is preferable to use a plurality of second channels 9. Preferred embodiments actually have a number of second channels equal to or greater than half the number of the first channels. The first and second channels 7, 9 are preferably distributed substantially evenly; thus typically the distance between the first channels 7 is substantially constant, as is substantially constant the distance between the different second channels 9. This contributes to equalize the gas inlet speeds between the different first channels 7.

Typically, the axes of the second channels are substantially perpendicular to the extrusion surface 2a; in any case the axes of the second channels are parallel or coincident, but preferably parallel, to those of the first channels.

At least part of the second channels 9, preferably at least 50%, more preferably at least 75% of the second channels are offset with respect to the first channels 7. A second channel 9 is offset with respect to the first channels 7 when its own axis does not coincide with any axis of the first channels 7. Preferably the axis of a second "offset" channel 9 is outside each of the openings 7b that are formed in the first chamber 8 by the first channels 7.

According to a possible aspect, the second channels 9 can be connected to a second chamber 10. In this case, preferably, the second channels 9 have their own ends that form openings in the first chamber 8, and the opposite end forming openings in the second chamber 10. Preferably, the second chamber 10 has largest dimension in the direction corresponding to the larger direction D2 of the extrusion surface 2.

Third channels 11 are fluidically connected to the second chamber 10 so as to direct the gases in the second chamber toward a fluidic outlet 17 of the spinneret 2. Third channels 11 are typically fewer in number than the second channels 9. Preferred embodiments provide for a single third channel 11. It should be noted that, hereinafter, generic reference will be made to "third channels" but the following description also applies to the case of a single third channel 11.

In an embodiment, at least part of the first and/or second and/or third (if any) channels 7, 9, 11 is preferably heated in order to avoid fumes condensation.

According to a preferred aspect, at least the first channels 7 and the first chamber 8 are made in the die 22 or in the assembly formed by the die 22 and the die holder 21. If present, the second chamber 10 (and thus the second channels 9) is also made in the die 22 or in the assembly formed by the die 22 and the die holder 21.

The apparatus 1 has one or more aspirators 12, or similar elements, adapted to create a low-pressure area at the extrusion surface 2a, so as to suction gas from the region at the filaments 100 leaving the extrusion holes 3 within the first and second channels 7, 9 and, if present, also within the third channels 11.

The one or more aspirators 12 are typically connected at the end of the fluidic path of gases within the spinneret 2, i.e., at the gas fluidic outlet 17 from the spinneret 2.

Typically, when there are the third channels 11, the one or more aspirators 12 are arranged at the third channels 11.

The suction elements may also comprise elements outside the spinneret 2. In particular, according to a preferred aspect, suction ports 13 are arranged, in use, below the extrusion surface 2a of the spinneret, laterally to the groups of extrusion holes.

In particular, the suction ports 13 are typically arranged to be distal to a plane P that is perpendicular to the extrusion surface 2a and is arranged between the two groups 4, 5 of extrusion holes and contains a line parallel to the larger dimension D1 of the extrusion surface 2a. Specifically, the filaments 100 that are extruded from an extrusion group 4, 5 are typically arranged in the portion of space between an extrusion port 13 and this plane P.

These extrusion ports are typically connected to respective aspirators 14, which are typically distinct from the one or more aspirators 12 fluidically connected to the openings 7a of the first channels 7.

The apparatus 1 also comprises cooling elements to cool the filaments 100 exiting the spinneret 2. Specifically, these cooling elements are adapted to direct gases, typically air, against the filaments 100 extruded from the extrusion holes 3.

These cooling elements are arranged below the extrusion surface 2a. According to a preferred aspect, the cooling elements comprise blowing elements 15, 15', i.e., fans, arranged below the extrusion surface 2a of the spinneret 2. The blowing elements 15, 15' are arranged laterally to the groups 4, 5 of extrusion holes 3, so as to direct a gas, typically air, against the filaments 100 extruded from the extrusion holes 3. The blowing elements are typically arranged below the suction ports 14 when these are present.

Preferably, the blowing elements comprise first blowing elements 15 and second blowing elements 15' arranged below the first blowing elements 15.

The blowing elements 15, 15' can be oriented and/or baffles can be provided, so as to select the inclination at which the gas ejected from these elements meets the filaments 100. Possibly, the blowing elements 15, 15' can be configured to direct multiple gas streams at different angles to each other against the filaments 100 extruded from the extrusion holes 3.

Preferably, in case there are first and second blowing elements, the gas speed and/or temperature of the first blowing elements 15 is different from the speed and/or temperature of the second blowing elements 15'.

Generally, the gas temperature of the gas ejected from the blowing elements is preferably between 10° C. and 60° C. When there are both first blowing elements and second blowing elements, the temperature of the first blowing elements 15 is between 14° C. and 45° C., while the temperature of the second blowing elements 15' is between 10° C. and 55° C.

In general, the blowing elements preferably generate a flow of gas, typically air, with controlled and adjustable pressure and speed; the speed is preferably in the range between 0.8 and 8 m/s, preferably between 1 and 5.0 m/s.

Below the cooling elements there is typically a region adapted to draw the filaments 100, and even more below an area for depositing them to form a nonwoven fabric. These regions are known in the art and are not discussed in detail herein.

In use, the filaments 100 are extruded from the extrusion holes 3. The cooling elements direct air against the filaments 100, for example by means of the first and second blowing elements 15, 15'.

The suction elements allow the gas ejected from the cooling elements to be removed after it has been heated by contact with the filaments 100, so as to promote the cooling of the same filaments.

In particular, the presence of the first suction channels 7 between the groups 4, 5 of extrusion holes allows the removal from the filaments 100 of heated gas, which would otherwise stagnate at the space between the filaments 100 extruded from the two groups 4, 5 of extrusion holes 3.

Since, indeed, the blowing elements 15, 15' are configured to blow gas against the filaments 100 from both sides of the latter, the region between the filaments 100 is subject to gas flows F1, F2 countering each other, i.e., directed against each other. This creates a region of substantial stagnation of heated gas, which hinders effective cooling of filaments 100. The suction of these gases, in contrast, makes it possible to counteract this problem by means of the first suction channels 7.

Moreover, the extrusion and cooling of the filaments 100 results in the formation of oligomers and, in general, high-temperature fumes that not only hinder the cooling of the filaments 100 but are also harmful to health. This situation is particularly accentuated in the above discussed gas stagnation region, that is, in the region between the filaments 100 extruded from the two groups 4, 5 of extrusion holes 3.

In addition, the drawing region, typically provided with channels having significantly lower temperature than both the filaments 100 and the gases present immediately below the spinneret 2, could be subject to the deposition of the aforementioned oligomer gases, which would condense. Since the filaments 100 can come into contact with these walls, the presence of condensed oligomers could slow down the filaments 100, thereby jeopardizing the quality thereof (particularly the final dimensions since less-drawn filaments 100 have higher linear density), and thus undermining the technical characteristics, as well as the appearance, of the final nonwoven fabric.

As above, the presence of the first suction channels 7 allows these fumes to be removed from that region.

This, in addition to better cooling and better safety, ensures better efficiency of the subsequent drawing process and, as a result, ensures better characteristics of the final nonwoven fabric.

Preferably, the suction ports 14 allow the heated gas, as well as oligomers and fumes, produced by the extrusion of the filaments 100, to be removed also in the region situated at the side of the filaments 100 extruded from extrusion holes 3.

In use, the temperature of the gas entering the first suction channels is typically between 100° C. and 250° C., preferably between 120° C. and 200° C. The temperature of the gas entering the suction ports is typically lower than the temperature of the gas entering the first suction channels 7 and is preferably between 50° C. and 150° C., more preferably between 80° C. and 120° C.

The suction elements, such as at the fluidic outlet 17 from the spinneret 2 or at the aspirator 12, are preferably equipped with filtering elements 16 adapted to separate the aforementioned oligomers or fumes from the air. Such filtering elements can be present not only at the outlet from the spinneret but they can also be fluidically connected to the suction ports, so that the gases suctioned by the suction ports 14, laterally to the spinneret 2, can also be processed.

In general, the apparatus may provide filtering elements adapted to filter gases, particularly to separate air from oligomers, before they are reintroduced into the outdoor environment, for example by the aspirators. This way, the oligomers can be retained in the apparatus and, for example, periodically collected and disposed of.

The filaments extruded from the die exhibit in the final fabric, that is to say after deposition on a suitable surface, linear density preferably between 1.1 and 4 dtex.

The invention claimed is:

1. Apparatus (1) for producing a nonwoven fabric, comprising:
   a. a spinneret (2) adapted to extrude pluralities of filaments (100), comprising an extrusion surface (2a) having at least one first group (4) of extrusion holes (3) and a second group (5) of extrusion holes (4), said first group (4) being distinct and spaced apart from said second group (5);
   b. cooling elements (15, 15') to cool said filaments, adapted to direct a gas against said filaments (100);
   c. suction elements (7, 8, 9, 10, 11, 12, 13, 14), adapted to remove gas from the space arranged, in use, below said extrusion surface (2a), at the outlet of said filaments (100) from said extrusion holes (3);
   d. drawing elements to draw said filaments (100);
   wherein said suction elements (7, 8, 9, 10, 11, 12, 13, 14) comprise a plurality of first suction channels (7) forming corresponding openings (7a) on said extrusion surface (2a), which are arranged between the first group (4) and the second group (5) of extrusion holes (3), said first channels (7) being fluidically connected to a first chamber (8), the suction elements (7, 8, 9, 10, 11, 12, 13, 14) further comprising one or more second suction channels (9) configured to suction gas from said first chamber (8), wherein a flow direction through said plurality of first suction channels (7) is the same as a flow direction through said plurality of second suction channels (9).

2. Apparatus (1) according to claim 1, wherein said gas is air.

3. Apparatus (1) according to claim 1, wherein said second suction channels (9) are fewer in number than said first suction channels (7) and have a larger average cross-section than the first suction channels.

4. Apparatus (1) according to claim 1, wherein said first and second channels have a longitudinal axis, the axes of said first and second suction channels being parallel or coincident.

5. Apparatus (1) according to claim 4, wherein at least part of said second suction channels (9) has an axis offset with respect to the axis of said first suction channel (7).

6. Apparatus (1) according to claim 1, comprising a second chamber (10) made in said spinneret (2), said one or more second suction channels (9) being configured to take gas from said first chamber (8) and deliver it to said second chamber (10), said suction elements (7, 8, 9, 10, 11, 12, 13, 14) comprising one or more third suction channels (11) configured to take gas from said second chamber (10), towards a fluidic outlet (13) from said spinneret (2).

7. Apparatus (1) according to claim 6, wherein said third suction channels (11) are fewer in number than said second suction channels (9), they consist of a single third suction channel (11) and they have a larger average cross-section than the second suction channels (9).

8. Apparatus (1) according to claim 1, wherein said suction elements (7, 8, 9, 10, 11, 12, 13, 14) comprise suction ports (13) arranged, in use, below the extrusion surface of the spinneret (2), laterally to said groups (4, 5) of extrusion holes (3).

9. Apparatus (1) according to claim 1, wherein said cooling elements comprise blowing elements (15, 15') arranged below the extrusion surface (2a) of the spinneret (2), laterally to said groups (4, 5) of extrusion holes (3) and also below said suction ports (13), if any.

10. Apparatus (1) according to claim 9, wherein said blowing elements comprising first blowing elements (15) and second blowing elements (15'), said second blowing elements (15') being arranged below said first blowing elements (15).

11. Apparatus (1) according to claim 1, wherein at least part of said suction elements (7, 8, 9, 10, 11, 12, 13, 14) are fluidically connected to a filtering element (16) for separating air from oligomers.

12. Process for producing a nonwoven fabric by means of an apparatus (1) according to claim 1, comprising the steps of:
   i. Extruding a plurality of filaments (100) from said groups (4, 5) of extrusion holes (3);
   ii. Cooling said filaments (100);
   iii. Drawing said filaments (100);
   iv. Depositing said filaments (100);
   further comprising a step of suctioning gases between the filaments (100) extruded from said first group (4) of extrusion holes (3) and the filaments extruded from said second group (5) of extrusion holes (3) through said openings (7a) of said first suction channels (7), on said extrusion surface (2a), said first channels (7) being fluidically connected to a first chamber (8), the suction elements (7, 8, 9, 10, 11, 12, 13, 14) further comprising one or more second suction channels (9) configured to suction gas from said first chamber (8), wherein a flow direction through said plurality of first suction channels (7) is the same as a flow direction through said plurality of second suction channels (9).

13. Process according to claim 12, comprising one or more of the following operating parameters:
   a. Gas temperature in said first suction channels (7) between 100° C. and 250° C.;
   b. Gas temperature in said suction ports (13) between 50° C. and 150° C.;
   c. Gas temperature of the gas ejected from said cooling elements (15, 15') between 10° ° C. and 60° C.;
   d. Gas speed in the first suction channels (7) and/or at the suction ports (13) between 0.4 and 6 m/s;
   e. Gas speed of the gas ejected from cooling elements (15, 15') between 0.8 and 8 m/s.

14. Process according to claim 13, wherein the gas temperature in said first suction channels (7) is between 120° C. and 200° C.

15. Process according to claim 13, wherein the gas temperature in said suction ports (13) is between 80° C. and 120° C.

16. Process according to claim 13, wherein the cooling elements (15, 15') comprise blowing elements and the temperature of the gas ejected from first blowing elements is between 14° C. and 45° C., and the temperature of the gas ejected from second blowing elements is between 10° ° C. and 55° C.

17. An apparatus (1) for producing a nonwoven fabric, comprising:
   a. a spinneret (2) adapted to extrude pluralities of filaments (100), comprising an extrusion surface (2a) having at least one first group (4) of extrusion holes (3) and a second group (5) of extrusion holes (4), said first group (4) being distinct and spaced apart from said second group (5);

b. cooling elements (15, 15') to cool said filaments, adapted to direct a gas against said filaments (100);

c. suction elements (7, 8, 9, 10, 11, 12, 13, 14), adapted to remove gas from the space arranged, in use, below said extrusion surface (2*a*), at the outlet of said filaments (100) from said extrusion holes (3);

d. drawing elements to draw said filaments (100);

wherein said suction elements (7, 8, 9, 10, 11, 12, 13, 14) comprise a plurality of first suction channels (7) forming corresponding openings (7*a*) on said extrusion surface (2*a*), which are arranged between the first group (4) and the second group (5) of extrusion holes (3), said first channels (7) being fluidically connected to a first chamber (8), the suction elements (7, 8, 9, 10, 11, 12, 13, 14) further comprising one or more second suction channels (9) configured to suction gas from said first chamber (8), and further comprising a second chamber (10) made in said spinneret (2), said one or more second suction channels (9) being configured to take gas from said first chamber (8) and deliver it to said second chamber (10), said suction elements (7, 8, 9, 10, 11, 12, 13, 14) comprising one or more third suction channels (11) configured to take gas from said second chamber (10), towards a fluidic outlet (13) from said spinneret (2).

\* \* \* \* \*